Aug. 18, 1953   L. M. TEMPLE   2,649,493
BATTERY CONNECTION
Filed July 26, 1949

6 Volt Battery

1½ Volt Battery

3 Volt Battery

INVENTOR
Lemuel M. Temple
BY
ATTORNEYS

Patented Aug. 18, 1953

2,649,493

UNITED STATES PATENT OFFICE 2,649,493

BATTERY CONNECTION

Lemuel M. Temple, North Haven, Conn., assignor to Olin Industries, Inc., New Haven, Conn., a corporation of Delaware Application July 26, 1949, Serial No. 106,788

8 Claims. (Cl. 136—135)

This invention relates to primary batteries and more particularly to an arrangement of battery connections whereby greater flexibility and interchangeability of multicell batteries may be obtained.

According to present practice, multicell batteries are now constructed to produce a specific voltage or voltages. That is, the cells are permanently connected to each other within the battery in series, parallel or series-parallel, as the case may be, to produce the desired voltage. Batteries of the same voltage use one type of socket which requires a mating plug designed to fit that socket and only that socket. Batteries of other voltages are equipped with sockets specifically designed for a particular type of plug which will fit that socket and only that socket. Thus, in any group of batteries having different voltages, plugs with different mechanical arrangements of the pins are used in order that only one type of battery can be connected to only one type of plug. The use of mechanically different plugs for a series of batteries having different voltages insures that the correct battery is always used so that short circuits or overvoltage of circuit components cannot occur. As a result adequate stocking of each voltage type of battery must be maintained in a communication center for reliable communications. If a shortage of batteries of a certain voltage occurs, available batteries of a different voltage cannot be used because the plug of the apparatus to which current is to be supplied would not fit batteries not designed for use with it.

Many specific types of batteries must, therefore, be available for use in radio receivers, transmitters and similar equipment. The permanent connection of the cells to provide specific voltages thus results in the necessity of stocking a greater number of batteries than would be the case if a single type of battery could be used in a number of installations in which different voltages are required.

In the present invention I provide a battery in which the two terminals of each cell are connected to separate terminals of a socket. By the use of suitable plugs, the equipment to be operated can be connected to the battery to provide the desired voltage. For example, in a 4 cell "A" battery the terminals of the cells are connected to the eight terminals of an octal socket. Employing a plug with one arrangement of connections between the pins, the plus terminal of each cell may be connected to the minus terminal of the adjacent cell to form a series connection and provide a 6 volt battery. By using plugs with different connections between the pins the cells may be connected in series-parallel or in parallel or one cell may be connected to suitable leads to provide 1½ volts from a single cell and the other three cells may be connected in series to provide 4½ volts.

In the accompanying drawing I have shown one embodiment of the invention. In this showing:

Figure 1:
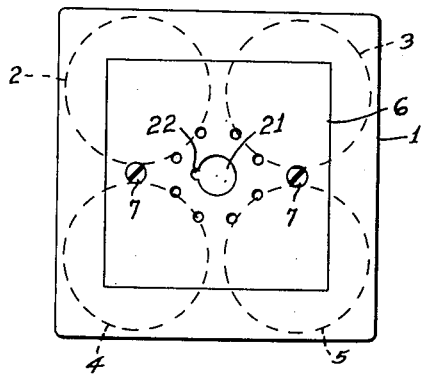
Fig. 1 is a plan view of a complete four cell battery with an octal socket mounted thereon.
Figure 4:
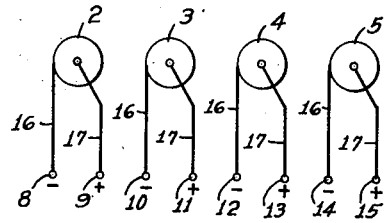
Fig. 4 is a diagrammatic view of the four cells of the battery illustrating the terminal connections to the sockets.
Figure 2:
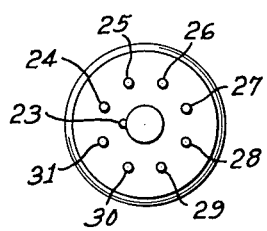
Fig. 2 is an end view of a plug.
Figure 3:
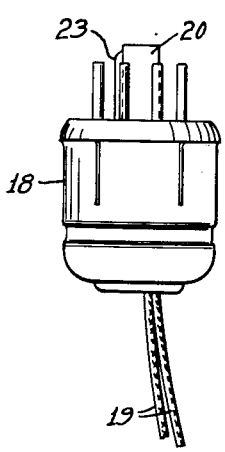
Fig. 3 is a side view of the plug.

Referring to the drawing, the reference numeral 1 designates generally a suitable outer casing in which the four cells 2, 3, 4 and 5 of the battery are arranged. Instead of connecting the terminals of the cells to the terminals of adjacent cells of opposite polarity for series connection or to terminals of the adjacent cells of the same polarity for parallel connection, I provide a socket member 6 which is mounted on the top of the battery and secured thereto by screws 7 or other suitable fastening means. The socket member may be formed of a sheet of any suitable insulating material and is provided with sockets on its inner face which are illustrated in Fig. 4 of the drawing. As shown, there are two sockets or terminals for each cell, the sockets being designated by the reference numerals 8, 9, 10, 11, 12, 13, 14 and 15. Alternate sockets 8, 10, 12 and 14 are connected to the minus terminals of the cells by suitable wires 16 and the other sockets 9, 11, 13 and 15 are connected to the plus terminals or the carbon electrodes by lead wires 17.

In the battery as thus formed the cells are, therefore, disconnected from each other and to connect the cells I employ a mating plug. The plug consists of a body portion 18 receiving a pair or more of lead wires 19. As in the usual construction, the plug is provided with a center post 20 which is received in a central opening 21 of the socket. As shown, the opening 21 is connected to a groove 22 which receives a rib 23 on the side of the pin 20 to properly position the plug in the socket. The plug is provided with a number of connecting pins equal to the number of socket openings, in this instance eight, designated by the reference numerals 24, 25, 26, 27, 28, 29, 30 and 31.

Figure 5:
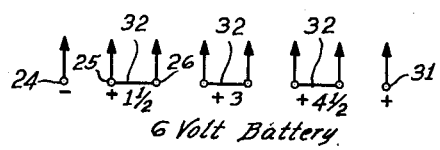
Fig. 5 is a diagrammatic view of the connections of a plug to connect the four cells of the battery in series.

The interior construction of the plug, illustrated diagrammatically in Figs. 5 to 8 of the drawing, determines the output obtained when the battery is put in use. Thus, for a series connection of the four cells of a battery, the connecting pin 24 is received in the socket 8, which is connected to the minus terminal of the first cell. The plus sockets 9, 11 and 13 of the intermediate cells are connected within the plug to the minus sockets 10, 12 and 14 by connections 32 and the end plus socket 15 receives the pin 31. It will thus be seen that when a plug 18 interiorly connected, as illustrated in Fig. 5 of the drawing, is used with an "A" battery of four cells of 1½ volts each, the four cells are connected in series to provide a 6 volt battery.

Figure 6:
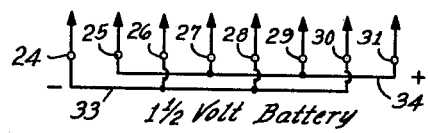
Fig. 6 is a similar view of a plug to connect the four cells in parallel.

Referring to Fig. 6 of the drawing, in the construction there diagrammatically illustrated, pins 24, 26, 28 and 30 which are received in the minus sockets 8, 10, 12 and 14, are connected to each other by connection 33 and pins 25, 27, 29 and 31, which are received in the plus sockets 9, 11, 13 and 15, are connected to each other within the plug by connector 34. Thus, when the plug illustrated in Fig. 6 is placed in the socket, the plus terminals of the cells are connected to each other and the minus terminals of the cells are connected to each other forming a parallel connection to produce a 1½ volt "A" battery.

Figure 7:
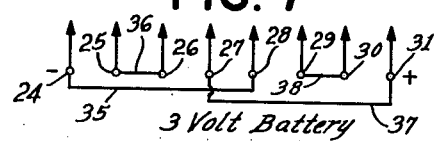
Fig. 7 is a similar view of a plug to connect the four cells in series-parallel.

With a plug constructed, as diagrammatically illustrated in Fig. 7 of the drawing, the cells are connected in series-parallel to provide a 3 volt battery. Thus, the pin 24 of the first cell is connected to the pin 28, which is received in the socket 12 to connect it to the minus terminal of the third cell by a connection 35 and the plus terminal of the first cell and the minus terminal of the second cell are connected to each other by a connection 36 between pins 25 and 26. Likewise, the plus terminal of the second cell and the plus terminal of the fourth cell, whose sockets receive pins 27 and 31, are connected by a connection 37 and the plus terminal of the third cell and the minus terminal of the fourth cell, whose sockets receive pins 29 and 30, are connected by a connection 38 between these two pins. When the pins 24 and 31 are connected to the leads, a 3 volt output is obtained from the battery.

Figure 8:
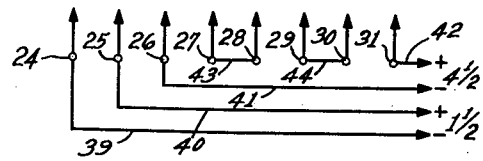
Fig. 8 is a diagrammatic view of a plug provided with two sets of leads to provide 1½ volts from one cell and connect the other three cells in series.

In the construction shown in Fig. 8 of the drawing, two sets of leads are provided to provide an output of 1½ volts and 4½ volts. As shown, the pins 24 and 25 which are received in socket terminals 8 and 9 connected to the first cell are provided with leads 39 and 40. This provides a 1½ volt output from the single cell. The other three cells are connected in series and connected to leads 41 and 42. As shown, pin 26 is connected to one lead and pin 31 to the other. Pins 27 and 28, which are received in sockets 11 and 12, respectively, are connected by a lead 43 and pins 29 and 30, which are received in sockets 12 and 13, are connected by a lead 44.

In the use of such an arrangement the cord connections of the plugs may be of different colors and may be marked to indicate what the connections are within the plug. A user, after some period of time, would learn the different colors used for the different connections and would not have to rely upon the designations. Connections would preferably be standardized systematically by providing always that a given pin of the plug and a given terminal in the socket constitutes the negative terminal of the battery.

The invention has been illustrated in connection with a four cell "A" battery but may, of course, be applied to batteries of any number of cells and to batteries of blocks of cells of any voltage. Thus, a battery of twenty four individual cells could be constructed by arranging the cells as four blocks of six cells each. By connecting the six cells of each block in parallel, and then further connecting the two terminals of each block to socket terminals as shown in Fig. 4, a high capacity "A" battery is obtained. Such a battery can provide a variety of voltages by the use of plugs connected as shown in Figs. 5 to 8. Likewise, it will be understood that each block of cells in a battery may consist of a number of individual cells connected in series or in series-parallel, in accordance with the voltage output and capacity desired in the battery. Each block of the battery may thus consist of a stack of individual cells constituting a battery having a voltage which is a multiple of the voltage of an individual cell. In any construction in accordance with this invention, the socket member and the plug are provided with twice as many connections as the number of blocks of cells in the battery, i. e., one plug connection and one socket connection is provided for the positive terminal of every block and another plug connection and socket connection is provided for the negative terminal of every block. It will also be clear that the type of plug and socket will depend on the number of blocks of cells used in the batteries; for example, a plug with ten pins and a socket with ten connections would be used with a battery containing five blocks of cells while a plug with twelve pins and a socket with twelve connections would be used with a battery containing six blocks of cells.

It will be apparent that the construction provides greater flexibility and greater interchangeability. Because of the perishable nature of dry batteries, this interchangeability is of importance. Also the elimination of internal connections between the cells reduces the possibility of circulating currents forming while the battery is on shelf and reduces terminal leakage under high humidity conditions. Other connections than those illustrated may, of course, be used. Thus, in the form shown in Fig. 5, leads may be connected to terminals 25, 27 and 29 to obtain 1½, 3 and 4½ volts, respectively. Similarly leads can be connected at intermediate points in the plugs of Fig. 7 and Fig. 8 to obtain other voltages.

In the claims, the word "unit" is employed to designate either a single cell, or a block of cells connected to a pair of the socket terminals.

It is also to be understood that the type of plug and socket for "A" batteries should differ from that used in "B" batteries, in order to prevent any possibility of the insertion of "A" battery plugs into "B" battery sockets.

I claim:

1. A battery construction capable of delivering one of a number of voltages, said battery comprising a plurality of cell units, each having a positive terminal and a negative terminal, a socket member for the battery having a socket individually connected to each said terminal, and a series of plugs to be used alternately and separately with said battery to provide the desired voltage, each plug carrying pins to be received in the sockets, two of the pins being connected to leads, and connections between the remaining pins to connect the cell units to each other.

2. A battery construction comprising a plurality of cell units, each having a positive terminal and a negative terminal, a socket member for the battery having a socket individually connected to each said terminal, and a plug, pins carried by the plug to be received by the sockets, two of the pins being connected to leads, and connections between the other pins to connect the cell units to each other.

3. A battery construction comprising a container, a plurality of cell units each having a positive terminal and a negative terminal within the container, an outlet member for the battery having an outlet individually connected to each said terminal, means for interconnecting selected outlets to connect the cell units to each other, and leads connected to certain of the outlets.

4. A battery construction comprising a container, a plurality of cell units each having a positive terminal and a negative terminal within the container, an outlet member for the battery having an outlet individually connected to each said terminal, and a plug to co-act with the outlet member, contact members carried by the plug to engage the outlets, leads connected to two of the contact members, and connections between adjacent contact members to connect the cell units of the battery in series.

5. A battery construction comprising a container, a plurality of cell units each having a positive terminal and a negative terminal within the container, an outlet member for the battery having an outlet individually connected to each terminal, and a plug to co-act with the outlet member, contact members carried by the plug to engage the outlets, leads connected to two of the contact members, and connections between alternate contact members to connect the cell units of the battery in parallel when the plug is inserted in the contact member.

6. A battery construction comprising a container, a plurality of cell units each having a positive terminal and a negative terminal within the container, an outlet member for the battery having an outlet individually connected to each said terminal, and a plug to co-act with the outlet member, contact members carried by the plug to engage the outlets, a connection between a spaced pair of contact members to connect said contact members to negative terminals of two of the cell units, a connection between a second spaced pair of contact members to connect them to positive terminals of two of the cell units, and connections between adjacent contact members to connect the remaining cell units.

7. A battery comprising a plurality of cell units each having a positive and a negative terminal, an outlet member mounted on said battery having an outlet individually connected to each of the said terminals, and a connector member including battery lead wires attached to said outlet member, said connector member having a conductive element in contact with each individual outlet and connecting all the cell units together and to said lead wires.

8. A battery construction capable of delivering one of a number of voltages, said construction comprising a container, a plurality of cell units each having a positive terminal and a negative terminal within the container, a socket member for the battery having a socket individually connected to each said terminal, and a series of plugs to be used alternately and separately with said battery to provide the desired voltage coacting with the socket member to provide one of a series of voltages, each plug carrying contact members to engage the sockets, certain of the contact members being connected to each other, and leads connected to certain of the contact members.

LEMUEL M. TEMPLE.

References Cited in the file of this patent

UNITED STATES PATENTS

| Number | Name | Date |
| --- | --- | --- |
| 2,096,627 | Deibel | Oct. 19, 1937 |
| 2,209,185 | Bower et al. | July 23, 1940 |
| 2,225,460 | Porth | Dec. 17, 1940 |
| 2,359,468 | Deibel | Oct. 3, 1944 |

FOREIGN PATENTS

| Number | Country | Date |
| --- | --- | --- |
| 100,599 | Australia | Apr. 8, 1937 |
| 402,643 | Great Britain | Dec. 7, 1933 |